Nov. 28, 1967     R. B. NEWMAN     3,355,207
LOCKING MECHANISM
Filed Feb. 26, 1965
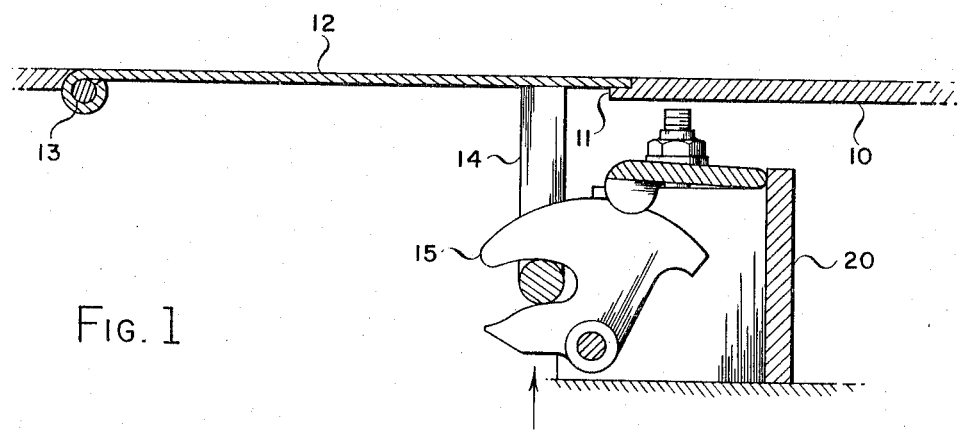
FIG. 1
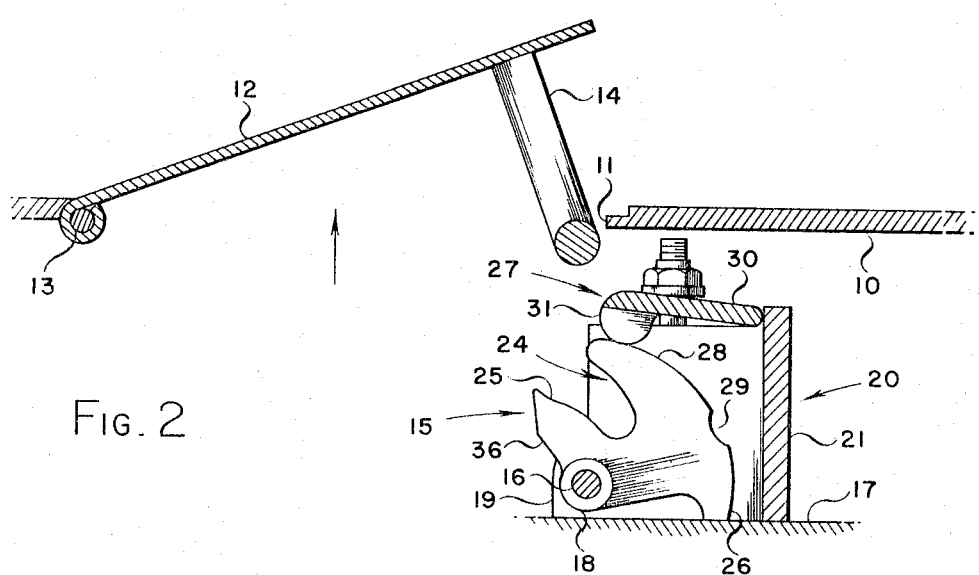
FIG. 2
FIG. 3
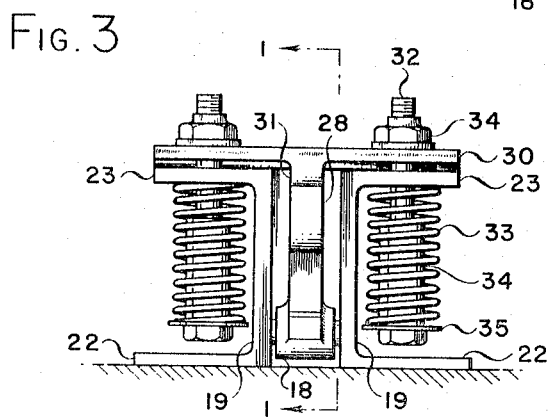
INVENTOR.
RONALD B. NEWMAN
BY
*George Sullivan*
Agent United States Patent Office 3,355,207
Patented Nov. 28, 1967

3,355,207
LOCKING MECHANISM
Ronald B. Newman, Newhall, Calif., assignor to Lockheed Aircraft Corporation, Burbank, Calif.
Filed Feb. 26, 1965, Ser. No. 435,485
4 Claims. (Cl. 292—78)

This invention relates to locking devices, and more particularly to a locking mechanism responsive to a predetermined force or load for its release.

The present invention contemplates a locking mechanism adapted to engage and secure an associated member against movement and to automatically release such member under a force of predetermined value. In addition, this locking mechanism includes means for its adjustment whereby the amount of force required to release it may be varied within a preselected range to thereby accommodate associated members that are subjected to different normal or design forces.

While the instant locking mechanism has general application wherever an automatic or spontaneous release is required, it finds particular utility in the control and operation of fluid pressure release systems. In this application the locking mechanism engages and secures an emergency vent closure in the wall of a compartment having a normal or selected internal pressure. Conventional seals may be employed around or adjacent this closure to maintain the desired pressure. When for any reason the pressure within the compartment exceeds the adjusted value of the locking mechanism, it is actuated thereby to release the closure and vent the compartment. The possibility of explosion or structural damage to the compartment due to excessive internal pressures is thus eliminated.

In aircraft, for example, the major components thereof include internal spaces or voids which in effect constitute compartments completely enclosed by the outer skin, partitioning ribs or bulkheads, etc., rendering them in many instances airtight. The aircraft also contains various pressurized fluid conduits or lines which pass through these compartments. In the event of fluid leakage for any reason from these lines, the internal pressure of the compartment, i.e., internally of the aircraft component, increases to a point where it can and does exceed the structural integrity of the defining walls, resulting in irreparable damage.

As a safety measure, therefore, various release vents including actuators for the operation thereof have been heretofore employed to permit the escape of excessive pressure buildup within such compartments. To insure the rapid release of this internal pressure, relatively large openings have been provided in the walls defining the compartment with doors or closures to normally fill and seal them and thereby maintain a desired internal pressure within the aircraft. When the internal pressure increases, these closures are opened to vent the excessive pressure. Thus, it is imperative that the actuators employed be highly reliable and timely operated.

The locking mechanism herein proposed constitutes such an actuator as well as a lock to secure the closure in position filling and sealing the vent opening during normal pressure conditions. To this end, this locking mechanism comprises a minimum of operating parts and relies on the force of the internal pressure itself for actuation to assure its spontaneous operation at the moment of an incipient excessive pressure condition.

Moreover, since both the normal and excessive pressure conditions will vary depending upon the particular application and location of the vent opening and its geometry, the locking mechanism as herein proposed includes an adjustable feature whereby it is readily adaptable to a range of operating conditions. At the same time it may be used and reused indefinitely, incurring no loss in its designed operating efficiency. When installed or reinstalled in operative position, its design is such that it is automatically rendered operative by movement of the vent closure to the closed position.

With the above and other obects in view as will be apparent this invention consists in the construction, combination and arrangement of parts all as hereinafter more fully described, claimed and illustrated in the accompanying drawings wherein:

FIGURE 1 is a sectional view taken along line 1—1 of FIGURE 3 to illustrate a locking mechanism in accordance with the teachings of this invention as applied to a pressure relief vent provided in a compartment for the escape of pressure therefrom when it reaches a predetermined value and showing the locking engagement between the mechanism and the vent closure whereby the compartment is normally closed and sealed to maintain the desired internal pressure of the compartment.

FIGURE 2 is a similar view to show the disengagement between the locking mechanism and the vent closure by an application of force as indicated by the arrow whereby the compartment is vented to the atmosphere externally thereof; and FIGURE 3 is an end elevation of the locking mechanism in the position of FIGURE 1 to show the adjustable means by which the locking force applied to the vent closure is varied.

Referring more particularly to the drawings, 10 designates a compartment wherein a predetermined environmental or pressure condition is to be maintained. A vent opening 11 is provided in the wall of this compartment 10 and a closure 12 hinged as at 13 to open outwardly of the compartment 10 normally fills the opening 11. If desired, suitable seals may be employed between the wall of the compartment 10 defining the opening 11 and the adjacent portion of the closure 12 following conventional practice.

On its inner side the closure 12 carries a lock element which may be in the form of a loop 14 projecting therefrom into the compartment 10. Internally of the compartment adjacent the loop 14 and adapted for coaction therewith is a catch 15 pivotally mounted as at 16 on fixed structure 17 of the compartment 10. To that end, the catch 15 is formed or otherwise provided adjacent its edge with a bearing 18 that is pierced centrally for passage of the pivot pin 16. The pin 16 is in turn carried by and disposed transversely between the arms 19 of a bracket member 20 at one side thereof adjacent the structure 17. These arms 19 are identical one with the other and are interconnected by a transverse web 21 at the other side thereof, i.e., remote from the pin 16. At its opposite ends each arm 19 terminates in laterally and outwardly disposed flanges 22 and 23, the flanges 22 being adapted to abut the surface of the structure 17 to which it is secured in any conventional manner.

The location of the pivot pin 16 on the bracket 20 with respect to the web 21 as above described permits the catch 15 to swing to and from positions within the bracket 20 and projecting outwardly therefrom. The catch 15 is formed with a recess or slot 24 in its outward side having a transverse dimension adjacent its base substantially equal to that of the loop 14. The edge 25 of the catch 15 defining the slot 24 projects at least in part at all times outwardly of the bracket 20 and constitutes a cam surface being adapted to engage and coact with the loop 14 in moving to and from its extreme position with the closure 12 filling the opening 11. The catch 15 is thereby rotated about its pivot pin 16, such rotation being limited in one direction by a toe 26 formed on the inner side of the catch 15 striking the structure 17. Rotation of the catch 15 is limited in the other direction by a spring-loaded latch 27 coacting and in constant engagement with an arcuate surface 28 defining the catch 15 between the slot 24 and toe or stop 26 and having a depression or notch 29 therein complemental to the latch 27.

The latch 27 comprises a plate 30 disposed in face-to-face relationship with the outer surfaces of the flanges 23 and formed medially of its length with a depending rounded projection 31 disposed in the space between the arms 19 for abutting contact with the arcuate surface 28 of the catch 15. Adjacent each of its opposed ends the plate 30 is pierced by a hole corresponding to and adapted for alignment with a hole in each flange 23 for the passage therethrough of a bolt 32. The head of each such bolt 32 is disposed in the space defined by each arm 19 and the adjacent flanges 22 and 23 of the brackets 19. A compression spring 33 is mounted on the shank of each bolt 32 between the flange 23 and the head of the bolt 32.

At its other end each bolt 32 is provided with a nut 34 which abuts the outer surface of the plate 30 whereby the normal action of the springs 33 maintains the projection 31 in constant contact with the arcuate surface 28 of the catch 15. In order to maintain each spring 33 in position on its bolt 32 against lateral movement, a sleeve guide 34 having an overall diameter substantially equal to the inner diameter of the spring is mounted on each bolt 32. At its outer end, i.e., the end associated with the head of the bolt 32, each guide 34 is formed with a lateral flange 35 against the surface of which the adjacent end of the spring 33 abuts to secure it in fixed position on its bolt 32.

In view of the foregoing construction and arrangement of the locking mechanism movement of the vent closure 12 to the position filling the opening 11 when the catch 15 is disposed in its inner position within bracket 20 causes the loop 14 to strike and slide along the cam surface 25. The catch 15 is thereby rotated to its outer position and when the closure 12 is fully seated within the opening 11, the notch 29 in the catch 15 has moved to a position in alignment with the latch projection 31. The catch 15 is thus engaged by the latch 27 due to the operation of the springs 33 and the closure 12 secured or locked against all further movement. The locking force applied by the springs 33 is adjustable by varying the position of the nut 34 on the bolt 32.

When, however, an outward force as indicated by the arrow (FIGURE 2) is applied on the closure 12 that exceeds the locking force of the springs 33, the catch 15 is rotated in the opposite direction by movement of the loop 14 along the cam surface 25 until stop 26 strikes the structure 17. At this time the loop 14 has cleared the edge of the catch 15 defining the slot 24 and the continued application of force in the direction of the arrow forces the closure 12 to its fully opened or extended position. The catch 15 is now disposed in its inner position within the bracket 20 and ready to receive and engage the loop 14 again to secure the closure 12, as above described.

While the locking mechanism has been hereinabove described as mounted internally of the compartment 10 on structure 17, it is equally adapted for operation as described when mounted externally of the compartment 10. Thus, the flanges 22 may be secured in conventional manner to the external surface of the wall of the compartment 10 or other external structure adjacent the free end of the closure 12 to project from the compartment 10. It is noted that the edge of the catch 15 between the slot 24 and the bearing 18 defines a surface 36 adjacent the bearing 18 that is substantially parallel to the closure 12 when filling the opening 11 with the catch 15 disposed outwardly of its bracket 20. By disposing the surface 36 in abutment with the outer marginal edge surface of the closure 12 at its free end forces applied on the closure 12 as indicated by the arrow in FIGURE 2 are concurrently applied to the surface 36 as indicated by the arrow in FIGURE 1. In this case the lock element or loop 14 would be carried by and project from the outer side of the closure 12 for coaction with the edge 25 during the locking operation as described.

It should be understood that the foregoing disclosure is illustrative of the invention and a preferred embodiment thereof. Numerous modifications or alterations may be made in this embodiment without departing from the spirit and scope of the invention which is to be limited only by the appended claims.

What is claimed is:
1. A locking mechanism comprising:
a catch rotatably mounted on a fixed pivot carried by relatively stationary structure;
a slot in the edge of said catch defining a cam surface adapted to receive a complemental element carried by a relatively movable member, at least the outer end of said slot being laterally disposed at all times with respect to said pivot and in the path of movement of said complemental element whereby movement of said member causes the rotation of said catch by said element to and from the engaged and disengaged positions;
an external surface of said catch defining an arc of a circle concentric about said pivot with a notch signal arcuate therein on the opposite side of said pivot with respect to said slot;
a latch having a single arcuate projection complemental to said notch and disposed therein only when the catch is located in the aforesaid element engaging position; and
resilient means constantly operative on said latch to maintain it with its arcuate projection in contact with said external catch surface at all times, the center of said pivot and the center of said notch forming an acute angle with the center of said pivot and the center of said complemental element when said catch is in said element engaging position whereby rotation of the catch as aforesaid to the element-engaging position is substantially unresisted by the force of said resilient means, ultimately locating said projection in said notch directing the forces of said resilient means on the catch in opposition to the forces applied by said movable member in the direction of the element-disengaging position.

2. The mechanism of claim 1 wherein said resilient means is adjusted to vary the force applied thereby on said latch.

3. The mechanism of claim 1 including a stop on said catch adapted to contact said stationary structure and thereby establish the extreme element-disengaging position aforesaid.

4. The mechanism of claim 1 wherein said catch is disposed between a pair of spaced arms secured to said relatively stationary structure, said latch includes a rigid plate disposed with its ends abutting the outer ends of said arms and its arcuate projection in the space between said arms, and said resilient means includes a spring operative on each end of said plate in the direction of said arms.

References Cited

UNITED STATES PATENTS

| | | | |
|---|---|---|---|
| 930,534 | 8/1909 | Cox | 292—198 |
| 2,308,150 | 1/1943 | Bliss | 292—198 |
| 2,504,364 | 4/1950 | Wagner et al. | 292—103 X |
| 2,901,277 | 8/1959 | Anderson | 292—78 |
| 3,041,098 | 6/1962 | Johnson et al. | 292—78 |

FRANCIS K. ZUGEL, *Primary Examiner.*

EDWARD C. ALLEN, MARVIN A. CHAMPION, *Examiners.*

J. R. MOSES, *Assistant Examiner.*

UNITED STATES PATENT OFFICE
CERTIFICATE OF CORRECTION

Patent No. 3,355,207                      November 28, 1967

Ronald B. Newman

It is hereby certified that error appears in the above numbered patent requiring correction and that the said Letters Patent should read as corrected below.

Column 4, lines 24 and 25, for "notch signal arcuate" read -- single, arcuate notch --; line 27, for "single" read -- single, --; line 46, for "adjusted" read -- adjustable --.

Signed and sealed this 25th day of February 1969.

(SEAL)
Attest:

Edward M. Fletcher, Jr.                       EDWARD J. BRENNER
Attesting Officer                             Commissioner of Patents